(12) United States Patent
Chen

(10) Patent No.: US 12,138,896 B2
(45) Date of Patent: Nov. 12, 2024

(54) LAMINATING MACHINE

(71) Applicant: BONSEN ELECTRONICS LIMITED, Dongguan (CN)

(72) Inventor: Wenhui Chen, Dongguan (CN)

(73) Assignee: BONSEN ELECTRONICS LIMITED, Dongguan (CN)

( * ) Notice: Subject to any disclaimer, the term of this patent is extended or adjusted under 35 U.S.C. 154(b) by 0 days.

(21) Appl. No.: 17/636,177

(22) PCT Filed: Sep. 24, 2021

(86) PCT No.: PCT/CN2021/120085
§ 371 (c)(1),
(2) Date: Feb. 17, 2022

(87) PCT Pub. No.: WO2023/010669
PCT Pub. Date: Feb. 9, 2023

(65) Prior Publication Data
US 2024/0157694 A1 May 16, 2024

(30) Foreign Application Priority Data

Aug. 2, 2021 (CN) .......................... 202121780604.4
Aug. 2, 2021 (CN) .......................... 202121780636.4
(Continued)

(51) Int. Cl.
*B32B 41/00* (2006.01)
*B32B 37/00* (2006.01)
*B32B 37/12* (2006.01)

(52) U.S. Cl.
CPC .......... *B32B 41/00* (2013.01); *B32B 37/0007* (2013.01); *B32B 37/1284* (2013.01); *B32B 2309/02* (2013.01)

(58) Field of Classification Search
CPC . B32B 41/00; B32B 37/0007; B32B 37/1284; B32B 2309/02
See application file for complete search history.

(56) References Cited

U.S. PATENT DOCUMENTS 3,840,420 A * 10/1974 Sarcia ................... B32B 37/185
156/359
2010/0263800 A1* 10/2010 Singer ..................... B32B 39/00
156/580
2020/0130341 A1* 4/2020 Melamed ................ B32B 41/00

FOREIGN PATENT DOCUMENTS

CN      203637291 U    6/2014
CN      204160847 U    2/2015
(Continued)

*Primary Examiner* — George R Koch
(74) *Attorney, Agent, or Firm* — Justin Lampel

(57) ABSTRACT

The present invention discloses a laminating machine. A glue outlet roller set and a feeding driving device are arranged in a machine body; the glue outlet roller set is located on the side, close to an outlet, of a laminating roller set; the linear speed of the roller face of the glue outlet roller set is larger than that of the roller face of the laminating roller set; the static friction force between the glue outlet roller set and a laminating object is smaller than that between the laminating roller set and the laminating object; and when the laminating object enters the glue outlet roller set through the laminating roller set, the laminating roller set and the laminating object are in static friction fit, meanwhile, the glue outlet roller set and the laminating object are in sliding friction fit, the plastic-packaged laminating object is tensioned and subjected to glue outlet, a glue film is prevented from being wrinkled and corrugated, and the laminating quality is improved.

6 Claims, 6 Drawing Sheets

(30) Foreign Application Priority Data

Aug. 2, 2021 (CN) .......................... 202121780638.3
Aug. 2, 2021 (CN) ......................... 202121782181.X

(56) References Cited

FOREIGN PATENT DOCUMENTS

| | | |
|---|---|---|
| CN | 110525066 A | 12/2019 |
| CN | 113500786 A | 10/2021 |
| JP | H0866962 A | 3/1996 |
| KR | 101533736 B1 | 7/2015 |

* cited by examiner

LAMINATING MACHINE

TECHNICAL FIELD

The present invention relates to the technical field of laminator, and particularly relates to a laminating machine.

BACKGROUND ART

A laminating object is plastically packaged through a laminating roller set of a laminating machine, and after being rolled and plastically packaged through the high-temperature laminating roller set, the laminating object enters the cooling process and the cooling shaping process; and before the laminating object is output to an outlet of a machine body, the laminating object and a glue film of the laminating object are prone to being affected by the gravity effect, and under the feeding effect of the laminating roller set, the formed glue film is prone to wrinkling and corrugation, and the laminating quality is affected.

SUMMARY OF THE PRESENT INVENTION

In order to overcome the defects in the prior art, the present invention provides a laminating machine which can improve the laminating quality.

To achieve the purpose, according to the technical scheme, the laminating machine comprises a machine body, a control device and the laminating roller set which is arranged in the machine body; a heating assembly is arranged beside the laminating roller set; the heating assembly and the laminating roller set are electrically connected with the control device; the heating assembly and the laminating roller set are arranged in a spaced manner; an inlet is formed in the front side of the machine body, and an outlet is formed in the rear side of the machine body; a glue outlet roller set and a feeding driving device which are electrically connected with the control device are further arranged in the machine body; the glue outlet roller set is located on the side, close to the outlet, of the laminating roller set; the linear speed of the roller face of the glue outlet roller set is larger than that of the roller face of the laminating roller set; and the static friction force between the glue outlet roller set and the laminating object is smaller than that between the laminating roller set and the laminating object.

Compared with the prior art, the laminating machine provided by the present invention has the beneficial effects that the laminating object subjected to plastic packaging is tensioned through cooperation of the glue outlet roller set and the laminating roller set, wrinkling and corrugation of the glue film in the cooling shaping process are avoided, and the laminating quality is improved.

DETAILED DESCRIPTION OF THE EMBODIMENTS

Figure 1:
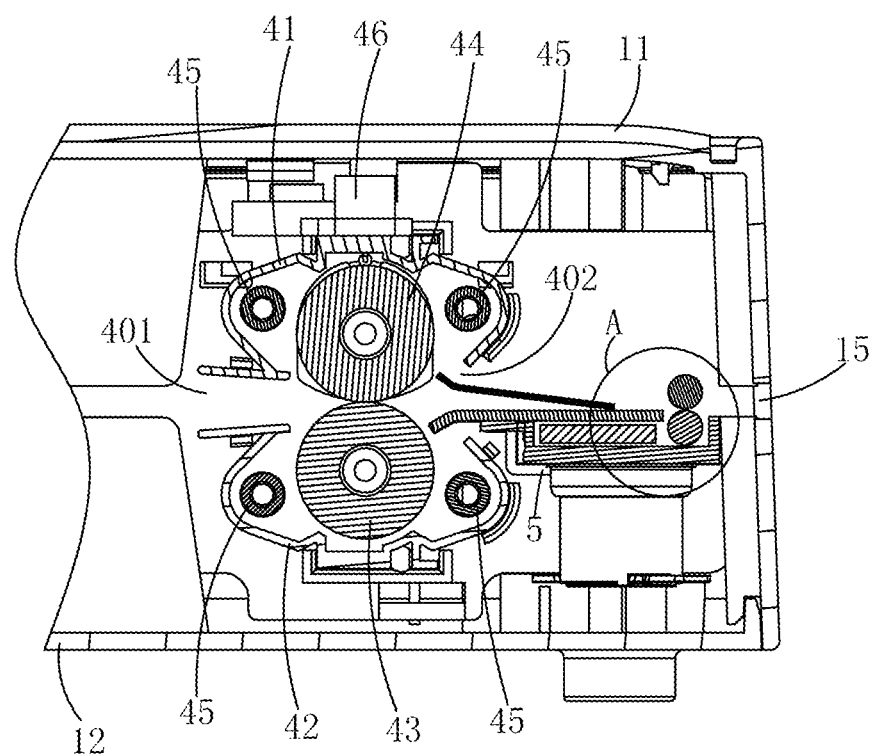
FIG. 1 is a cross-sectional schematic diagram of the present invention.
Figure 2:
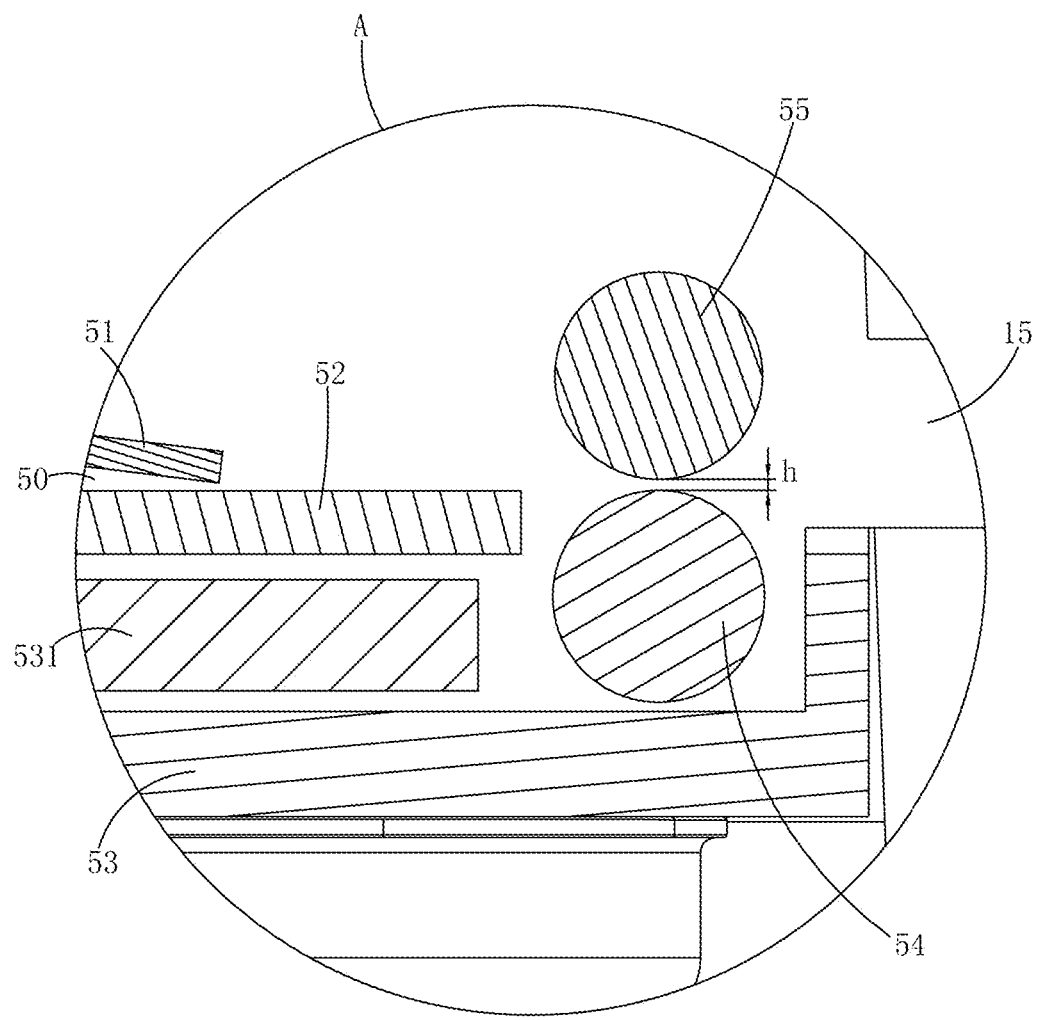
FIG. 2 is an enlarged diagram of part A in FIG. 1.
Figure 3:
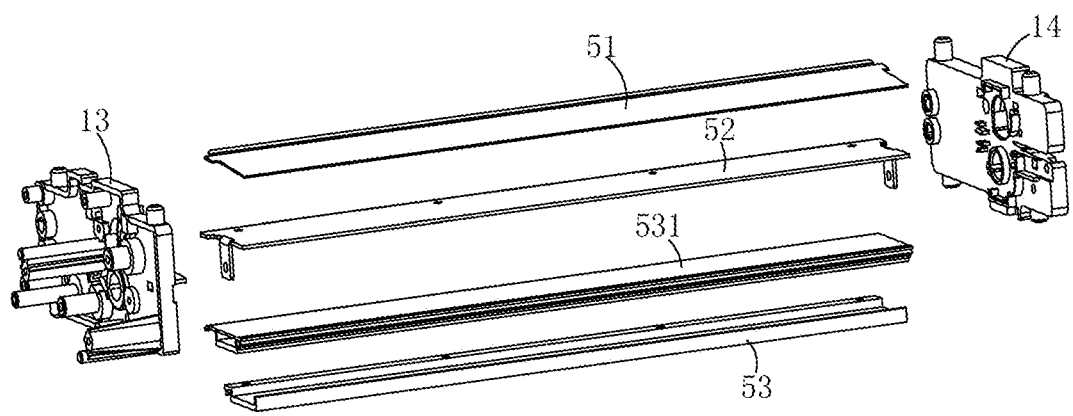
FIG. 3 is an exploded schematic diagram of a temperature supplementing and leveling mechanism of the present invention.
Figure 4:
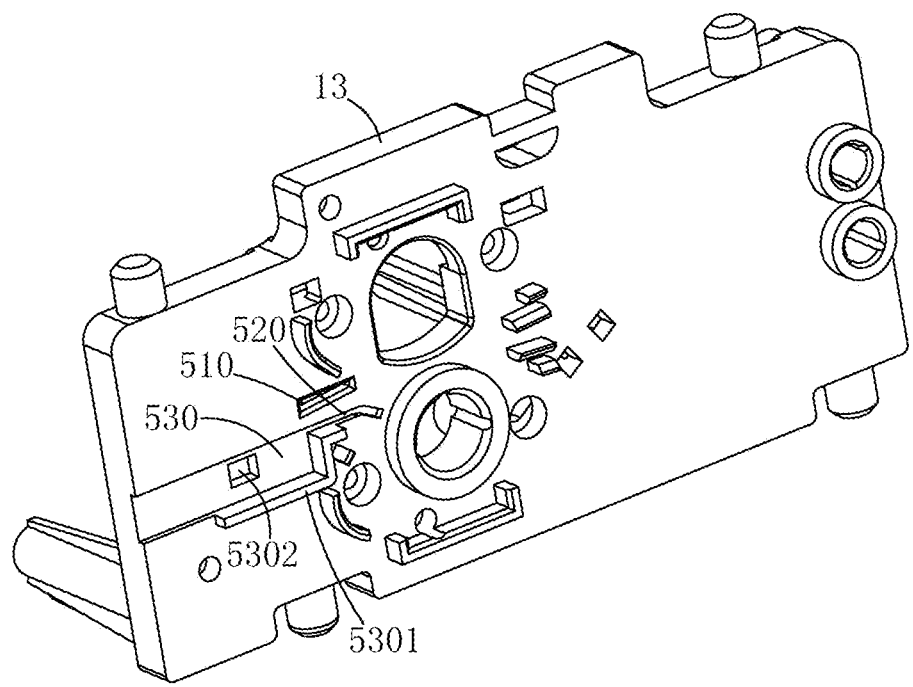
FIG. 4 is a structural schematic diagram of a first side plate of the present invention.
Figure 5:
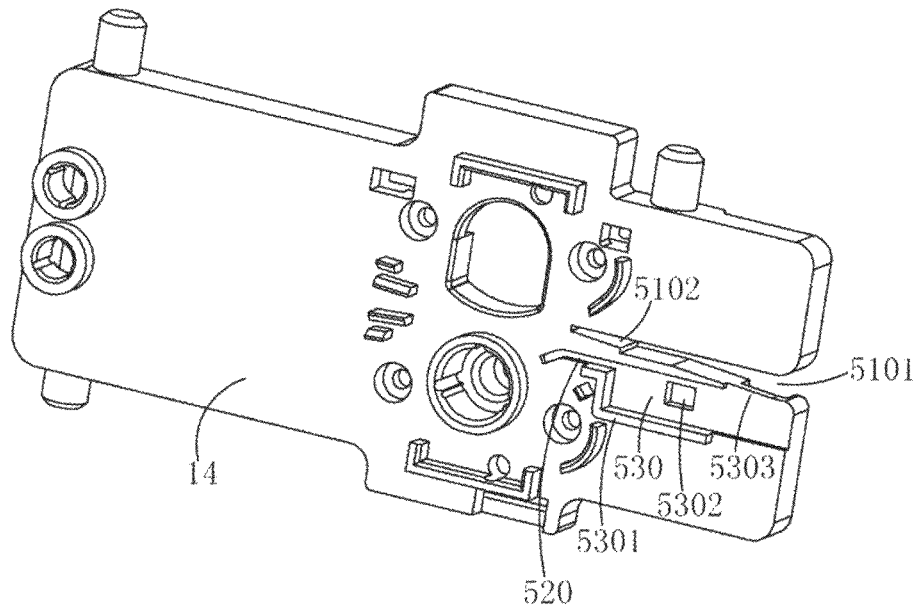
FIG. 5 is a structural schematic diagram of a second side plate of the present invention.

A laminating machine, as shown in FIGS. 1 to 9, comprises a machine body 1, a control device and a laminating roller set arranged in the machine body 1; a heating assembly is arranged beside the laminating roller set; the heating assembly and the laminating roller set are electrically connected with the control device; the heating assembly and the laminating roller set are arranged in a spaced manner; an inlet 10 is formed in the front side of the machine body 1, and an outlet 15 is formed in the rear side of the machine body 1 and is horizontally aligned with the inlet 10; the laminating roller set is arranged between the inlet 10 and the outlet 15; a glue outlet roller set and a feeding driving device which are electrically connected with the control device are further arranged in the machine body 1; the glue outlet roller set is located on the side, close to the outlet 15, of the laminating roller set; the glue outlet roller set and the laminating roller set are correspondingly in transmission connection with the feeding driving device; the laminating outlet roller set and the glue outlet roller set are subjected to coordinated pushing cooperation on a laminating object according to the feeding direction; the linear speed of the roller face of the glue outlet roller set is larger than that of the roller face of the laminating roller set, and the static friction force between the glue outlet roller set and the laminating object is smaller than that between the laminating roller set and the laminating object; when the laminating object enters the glue outlet roller set through the laminating roller set, the laminating roller set and the laminating object are in static friction fit, meanwhile, the glue outlet roller set and the laminating object are in sliding friction fit, the laminating object subjected to plastic packaging is tensioned through cooperation of the glue outlet roller set and the laminating roller set, wrinkling and corrugation of a glue film in the cooling shaping process are avoided, and the laminating quality is improved.

The machine body comprises an upper machine shell 11 and a lower machine shell 12 which are assembled and connected with each other, wherein an assembling space is defined by the upper machine shell 11 and the lower machine shell 12; the laminating roller set, the heating assembly, the glue outlet roller set and a laminating leveling device are arranged in the assembling space. The glue outlet roller set comprises a driving glue outlet roller 54 and a driven glue outlet roller 55 which are parallel to each other; the driven glue outlet roller 55 is located above the driving glue outlet roller 54; the driving glue outlet roller 54 is in transmission connection with the feeding driving device; each of the driving glue outlet roller 54 and the driven glue outlet roller 55 comprises a metal roller; roller surfaces of the two metal rollers are smooth; a laminating slipping structure is arranged between the two metal rollers; the laminating slipping structure comprises any one of a roller surface gap structure and an elastic roller set structure; a glue outlet gap h is formed among the roller surface gap structure, the roller surface of the driving glue outlet roller 54 and the roller surface of the driven glue outlet roller 55; the glue outlet gap h is smaller than the thickness of the laminating object; the elastic roller set structure, the roller surface of the driving glue outlet roller 54 and the roller surface of the driven glue outlet roller 55 are elastically matched in a jacking manner; and the two ends of the driven glue outlet roller 55 are connected with elastic devices including a spring or an elastic sheet and the like respectively. The roller surface gap structure or the elastic roller set structure is used for realizing sliding friction fit between the glue outlet roller set and the laminating object, and the friction force is in direct proportion to positive pressure, so that when the laminating object passes through the glue outlet roller set and the laminating roller set at the same time, the static friction force between the laminating object and the glue outlet roller set is smaller than the static friction force between the laminating object and the laminating roller set; and the linear speed of the roller surface of the laminating roller set is greater than the linear speed of the roller surface of the glue outlet roller set, so that the laminating object and the glue outlet roller set are in sliding friction fit.

The laminating roller set comprises an upper pressing roller 44 and a lower pressing roller 43 which are vertically aligned and are in transmission connection with the feeding driving device; the heating assembly comprises a plurality of heating pipes 45, and the heating pipes 45 are symmetrically arranged on the front side and the rear side of the upper pressing roller 44 and/or the lower pressing roller 43. The heat radiation rate of the upper pressing roller 44 and the lower pressing roller 43 is increased, the temperature rise speed of the upper pressing roller 44 and the lower pressing roller 43 is increased, and the preheating time is decreased. An upper core shell 41 and a lower core shell 42 which are symmetrically arranged are arranged on the upper side and the lower side of the laminating roller set correspondingly; each of the upper core shell 41 and the lower core shell 42 comprises a semi-surrounding shell, wherein the two semi-surrounding shells are arranged above the upper pressing roller 44 and below the lower pressing roller 43 in a semi-surrounding manner correspondingly, a heat seal inlet 401 and a heat seal outlet 402 are formed between the two semi-surrounding shells, the heat seal inlet 401 communicates with the inlet, and the heat seal outlet 402 communicates with the glue outlet roller set; the inner side of each semi-surrounding shell is plated with a heat reflection layer. A temperature detection device 46 is arranged on the top of the upper core shell 41 and electrically connected with the heating assembly; the temperature detection device 46 comprises an infrared temperature sensing unit or a thermocouple; and the temperature detection device 46 is used for detecting the roller face temperature of the laminating roller set in real time so that plastic packaging can be avoided at the too high temperature or the too low temperature, and the laminating quality of the laminating machine is guaranteed.

A temperature supplementing and leveling mechanism is arranged between the laminating roller set and the outlet 15 and comprises a leveling bottom plate 52, a leveling pressing plate 51 and a temperature supplementing unit 531 which is electrically connected with the control device; the leveling pressing plate 51 is arranged at the upper portion of the leveling bottom plate 52 and is downwards inclined in the feeding direction of the laminating roller set; a leveling channel 50 gradually closed from inside to outside is formed between the leveling pressing plate 51 and the leveling bottom plate 52; an inner side opening of the leveling channel 50 communicates with the outlet through the laminating roller set, and an outer side opening of the leveling channel 50 communicates with the outlet; and the temperature supplementing unit 531 is arranged at the bottom of the leveling bottom plate 52 and is in heat radiation fit with the leveling bottom plate 52, and the compensation temperature of the leveling bottom plate 52 is lower than the laminating temperature of the laminating roller set. The temperature supplementing and leveling mechanism is arranged between the laminating roller set and the outlet and used for performing flexible propping levelling as well as temperature compensating heating on the plastic-packaged laminating object, so that the temperature drop speed of the glue film is decreased, the situation that the glue film is wrinkled and corrugated due to sharp cooled is avoided, and the laminating quality is improved.

The top surface of the leveling pressing plate 51 is heated to reach a set compensation temperature T1; the roller surface of the laminating roller set is heated to reach a set laminating temperature T2 under the thermal radiation effect of the heating assembly; the compensation temperature T1 is lower than the laminating temperature T2; and the inventor obtains the following result through multiple tests: the compensation temperature T1 is preferably 70-90 DEG C., the laminating temperature T2 is preferably 110-112 DEG C., the temperature drop speed of the glue film can be decreased, so that the situation that the glue film is wrinkled and corrugated due to sharp cooled is avoided.

A temperature supplementing device 53 is arranged at the bottom of the leveling pressing plate 51 and comprises a temperature supplementing unit 531 arranged at the bottom of a leveling bottom plate 52, and the temperature supplementing unit 531 acts on the leveling pressing plate 51 and the driving glue outlet roller 54 through thermal radiation. A laminating leveling mechanism 5 is installed in a rear channel between a glue roller and the outlet, the heating temperature of the leveling bottom plate 52 to the glue film is lower than the heating temperature of the glue roller, so that the heat preservation effect is achieved, the temperature drop speed of the glue film is decreased, the situation that the glue film is wrinkled and corrugated due to sharp cooled is avoided, and the laminating quality is improved.

A first side plate 13 and a second side plate 14 which are arranged in parallel are arranged on the two sides of the interior of the machine body 1 respectively, leveling plate assembling structures are arranged on the inner side of the first side plate 13 and the inner side of the second side plate 14 respectively, each leveling plate assembling structure comprises a pressing plate assembling groove and a supporting plate assembling groove 530, wherein the pressing plate assembling groove formed in the first side plate 13 comprises a closed inserting groove 510, and the width of the closed inserting groove 510 is gradually increased from inside to outside; the pressing plate assembling groove formed in the second side plate 14 comprises an opening clamping groove 5101, the opening clamping groove 5101 is opened in the front side edge of the second side plate 14, and the width of the opening clamping groove 5101 is gradually increased in the opening direction; the two sides of the leveling pressing plate 51 are inserted into the closed inserting groove 510 and the opening clamping groove 5101 respectively, bottom plate assembling grooves 520 matched with the cross section of the leveling bottom plate 52 in shape and size are formed in the upper portions of the two supporting plate assembling grooves 530 of the first side plate 13 and the upper portions of the two supporting plate assembling grooves 530 of the second side plate 14 respectively, the bottom plate assembling grooves 520 extend horizontally, and the two sides of the leveling bottom plate 52 are movably inserted into the corresponding bottom plate assembling grooves 520 respectively; the bottoms of the two supporting plate assembling grooves 530 of the first side plate 13 and the bottoms of the two supporting plate assembling grooves 530 of the second side plate 14 protrude inwards to form positioning shoulders 5301 respectively, the two sides of the temperature supplementing unit 531 are movably clamped into the corresponding supporting plate assembling grooves 530 respectively, and the supporting plate assembling grooves 530 are in positioning fit with the corresponding positioning shoulders 5301; a temperature sensing assembling port 5302 is formed in the middle of each supporting plate assembling groove 530 in a sunken mode, a temperature sensing unit electrically connected with the control device is arranged in each temperature sensing assembling port 5302, and the temperature sensing units are connected with the leveling bottom plate 52; and an assembling notch 5303 used for avoiding inserting the leveling bottom plate 52 is formed in the upper portion of the supporting plate assembling groove 530 formed in the second side plate 14, and the assembling notches 5303 communicate with the opening clamping groove 5101. Inserting assembling of machine core spare parts is carried out through the first side plate 13 and the second side plate 14 which are arranged in parallel, the structure is simple, stable and reliable, the assembly is convenient, and the manufacturing cost is reduced.

Figure 6:
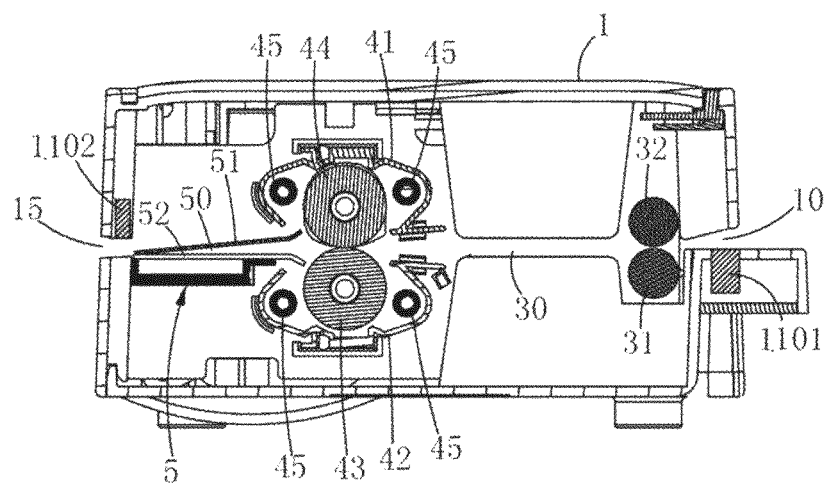
FIG. 6 is another cross-sectional schematic diagram of the present invention.

As shown in FIG. 6, a self-starting sensor 1101 in triggering fit with the laminating object is arranged at the inlet 10; a standby sensor 1102 in triggering fit with the laminating object is arranged at the outlet 15; and the self-starting sensor 1101 and the standby sensor 1102 are electrically connected with the control device. When the laminating object is inserted into the laminating inlet 10, the laminating object is in triggering fit with the self-starting sensor 1101, and the self-starting sensor 1101 sends a starting signal to the control device to start the laminating roller set and the heating assembly; and the standby sensor 1102 is arranged at the outlet 15, when the laminating object passes through the outlet 15, the laminating object is in triggering fit with the standby sensor 1102, and the standby sensor 1102 sends a standby signal to the control device to control the heating assembly to stop heating and temperature supplementing. Triggering devices are arranged at the inlet and the outlet of the machine body 1 correspondingly to judge whether the laminating object is input or not and whether plastic packaging is completed or not, the machine is started when the laminating object enters the laminating inlet, and the heating assembly stops heating and temperature supplementing and enters a standby state when the laminating object passes through the outlet after plastic packaging is completed, so that the using convenience of the whole machine is improved, and the machine does not need to be started and stopped manually; and in addition, automatic standby or shutdown is conducted in idle time, and energy consumption is reduced.

The self-starting sensor 1101 and the standby sensor 1102 respectively comprise a touch switch structure, and the touch switch structures are contact type microswitch structures or non-contact type sensing switch structures. The touch switch structures can be non-contact sensing type or contact type switches, it is not limited, and the touch switch structures are used for judging the condition that the laminating object passes through the laminating inlet 10 and the laminating outlet 15 respectively, have two opening and closing states and are used for judging whether the laminating object is inserted or completely passes through the laminating inlet 10 or the laminating outlet 15.

Each contact type microswitch structure comprises a trigger rotating shaft, a microswitch and an abutting block, wherein the trigger rotating shaft is arranged in the width direction of the laminating inlet 10 or the laminating outlet 15 and rotates around the axis of the laminating inlet 10 or the laminating outlet 15, the microswitch is electrically connected with the control device, the abutting block is fixedly connected to the end of the trigger rotating shaft, the microswitch is fixed to the end, close to the trigger rotating shaft, of the trigger rotating shaft, and the abutting block is in rotating fit with the trigger rotating shaft along with rotation of the trigger rotating shaft and is in triggering fit with the microswitch; a reset elastic piece is connected between each trigger rotating shaft and the machine body 1, each trigger rotating shaft is provided with a plurality of trigger fins, the trigger fins are aligned at intervals in the axis direction of the trigger rotating shafts, and the trigger fins block the laminating inlet 10 or the laminating outlet 15 in a normal state. According to the contact type microswitch structures provided by the present invention, when the laminating object passes through the laminating inlet 10 or the laminating outlet 15, the trigger fins are pushed and the trigger rotating shafts are triggered to rotate so as to drive the abutting blocks to abut against the microswitches, after the laminating object completely passes through the laminating inlet 10 or the laminating outlet 15, the trigger rotating shafts reset under the elastic action of the reset elastic pieces, the abutting blocks are separated from the abutting microswitches, and therefore the judgment that the laminating object completely passes through the laminating inlet 10 or the laminating outlet 15 is achieved.

The self-starting sensor 1101 is provided with a timing module used for controlling the laminating machine to be automatically shut down, and the timing module is in communication connection with the control device.

Figure 7:
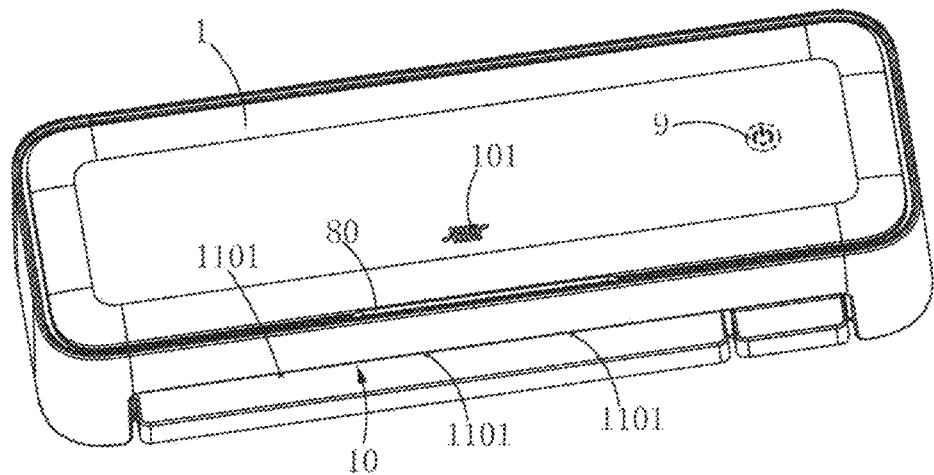
FIG. 7 is a structural schematic diagram of the surface of the present invention.
Figure 8:
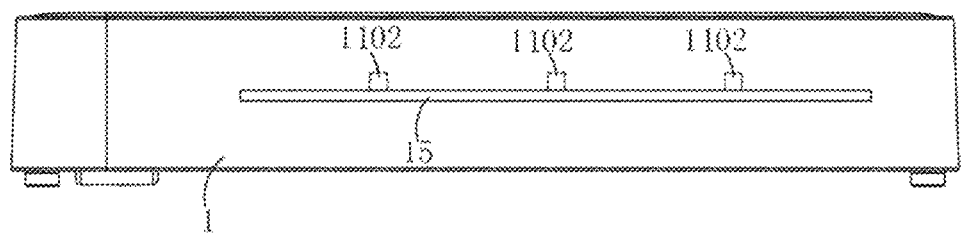
FIG. 8 is a structural schematic diagram of the present invention from a rear view angle.
Figure 9:
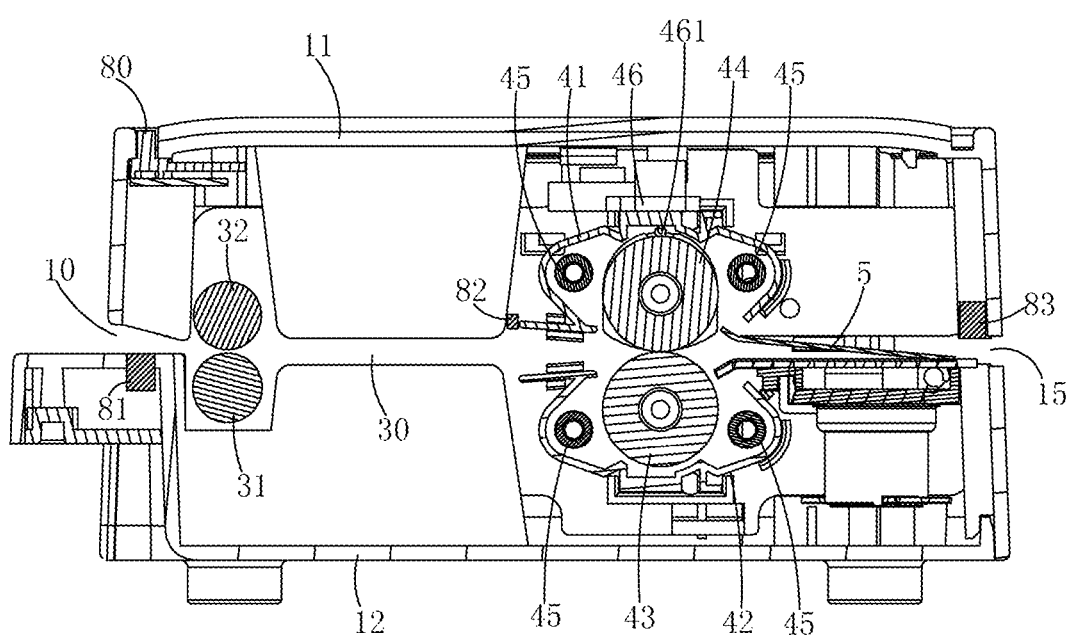
FIG. 9 is another cross-sectional schematic diagram of the present invention.

As shown in FIGS. 7 to 9, the laminating machine further comprises a progress display device and a laminating progress detection assembly; the laminating progress detection assembly and the progress display device are connected to the control device; the control device receives a progress detection signal of the laminating progress detection assembly and outputs a progress display signal to the progress display device; the progress display device comprises a PCB lamp panel 80 electrically connected with the control device; the PCB lamp panel 80 is provided with a plurality of lamp beads distributed along a straight line; and the lamp beads are combined to form a progress display part used for displaying the laminating progress. The feeding progress of the laminating object is detected through the laminating progress detection assembly in the machine body, the laminating progress is prompted through the progress display device, so that the use experience of a user is improved, and daily use operation is facilitated. Compared with an existing laminating machine, the laminating progress of the laminating object can be detected, external prompting can be provided, and the use experience of rapid and efficient transmission is provided for the user.

A glue inlet roller set is arranged at the laminating inlet 10, the glue inlet roller set comprises a driving glue inlet roller 31 and a driven glue inlet roller 32, a laminating channel 30 is arranged between the glue inlet roller set and a laminating roller set, and the heating assembly preheats the laminating roller set while the laminating object passes through the laminating channel 30, so that preheating time is obtained, and the technical effect that the machine is free of preheating is achieved.

The laminating progress detection assembly comprises a first infrared sensing unit 81, a second infrared sensing unit 82 and a third infrared sensing unit 83 which are electrically connected with the control device, wherein the first infrared sensing unit 81 is located at the position close to the laminating inlet 10, the first infrared sensing unit 81 is triggered when the laminating object passes through the laminating inlet 10, the first infrared sensing unit 81 sends a glue inlet signal to the control device, the control device receiving the glue inlet signal outputs a progress display signal to the progress display device, and the progress display device emits light to display a light effect representing the glue inlet state; the second infrared sensing unit 82 is located at the position close to the laminating roller set, the second infrared sensing unit 82 is triggered when the laminating object passes through the laminating roller set, the second infrared sensing unit 82 sends a rolling signal to the control device, the control device receiving the rolling signal outputs another progress display signal to the progress display device, and the progress display device emits light to display a light effect representing the rolling state; and the third infrared sensing unit 83 is located at the position close to the outlet 15, the third infrared sensing unit 83 is triggered when the laminating object passes through the outlet 15, the third infrared sensing unit 83 sends a glue outlet signal to the control device, the control device receiving the glue outlet signal outputs another progress display signal to the progress display device, and the progress display device emits light to display a light effect representing the glue outlet state.

The machine body 1 is provided with a heating reminding device 101 electrically connected with the control device; the heating assembly used for heating the roller surface temperature of the laminating roller set is arranged in the machine body 1, the heating assembly is located at the position close to the laminating roller set, and the heating assembly and the laminating roller set are arranged in a spaced manner; the heating assembly is electrically connected with the control device, when the heating assembly is started, the heating assembly outputs a heating reminding signal to the control device, and the control device receiving the heating reminding signal outputs a heating reminding starting signal to the heating reminding device 101 so as to control the heating reminding device 101 to be started; and the heating reminding device 101 comprises a reminding lamp assembly and/or a reminding sound box assembly. The control device sends a real-time starting and stopping control signal to the heating reminding device 101 according to the starting condition of the heating assembly, and the running condition of the heating assembly in the machine is reminded externally; when the machine generates power during temperature supplementing, a lamp or a sound box of the heating reminding device 101 is started, and a reminding lamp effect or a sound effect is given out; and when the machine stops temperature supplementing, and the control device controls the heating reminding device 101 to be stopped. Therefore, the temperature supplementing transmission time is short, and the energy-saving and environment-friendly concept can be embodied.

A hidden key structure 9 connected with the control device is arranged on the top of the machine body 1 and comprises a press key or a touch key.

The press key comprises a key base and a solid button elastically installed on the key base, the key base is further provided with a microswitch electrically connected with the control device, and the solid button is in trigger fit with the microswitch; and the machine body 1 is provided with a key assembling port, the solid button is movably embedded into the key assembling port, and the top face of the solid button is flush with the top face of the machine body 1.

The invention claimed is:

1. A laminating machine, comprising a machine body (1), a control device, and a laminating roller set arranged in the machine body (1), wherein a heating assembly is arranged beside the laminating roller set; the heating assembly and the laminating roller set are electrically connected with the control device; the heating assembly and the laminating roller set are arranged in a spaced manner; an inlet (10) is formed in a front side of the machine body (1), and an outlet (15) is formed in a rear side of the machine body (1); the laminating machine is characterized in that a glue outlet roller set and a feeding driving device which are electrically connected with the control device are further arranged in the machine body (1), the glue outlet roller set is located on a side, close to the outlet (15), of the laminating roller set, and the glue outlet roller set and the laminating roller set are in transmission connection with the feeding driving device; and a linear speed of a roller face of the glue outlet roller set is larger than a linear speed of a roller face of the laminating roller set, and a static friction force between the glue outlet roller set and a laminating object is smaller than that between the laminating roller set and the laminating object;

wherein a temperature supplementing and leveling mechanism is arranged between the laminating roller set and the outlet (15) and comprises a leveling bottom plate (52), a leveling pressing plate (51) and a temperature supplementing unit which is electrically connected with the control device, the leveling pressing plate (51) is arranged at an upper portion of the leveling bottom plate (52) and is downwards obliquely arranged downwards in the feeding direction of the laminating roller set, a leveling channel (50) gradually closed from inside to outside is formed between the leveling pressing plate (51) and the leveling bottom plate (52), an inner side opening of the leveling channel (50) communicates with the glue outlet roller set, and an outer side opening of the leveling channel (50) communicates with the outlet; and the temperature supplementing unit is arranged at the bottom of the leveling bottom plate (52), and a compensation temperature of the leveling bottom plate (52) is lower than a laminating temperature of the laminating roller set;

wherein a first side plate (13) and a second side plate (14) which are oppositely arranged in parallel are arranged on two inner sides of the machine body (1) respectively, leveling plate assembling structures are arranged on an inner side of the first side plate (13) and an inner side of the second side plate (14) respectively, each leveling plate assembling structure comprises a pressing plate assembling groove and a supporting plate assembling groove (530), the pressing plate assembling groove of the first side plate (13) comprises a closed inserting groove (510), and a width of the closed inserting groove (510) is gradually increased from inside to outside; the pressing plate assembling groove of the second side plate (14) comprises an opening clamping groove (5101), the opening clamping groove (5101) is opened in a front side edge of the second side plate (14), and a width of the opening clamping groove (5101) is gradually increased towards the outer side opening; and two sides of the leveling pressing plate (51) are inserted in the closed inserting groove (5101) and the opening clamping groove (5101) respectively;

wherein bottom plate assembling grooves (520) matched with a cross section of the leveling bottom plate (52) in shape and size are formed in upper portions of the two supporting plate assembling grooves (530) of the first side plate (13) and the second side plate (14) correspondingly, the bottom plate assembling grooves (520) are arranged in a horizontal extending mode, and two sides of the leveling bottom plate (52) are movably inserted into the corresponding bottom plate assembling grooves (520); and the bottoms of the two supporting plate assembling grooves (530) protrude inwards to form positioning shoulders (5301) correspondingly, two sides of the temperature supplementing unit are movably clamped and embedded into the corresponding supporting plate assembling grooves (530), and the supporting plate assembling grooves (530) are in positioning fit with the corresponding positioning shoulders (5301);

wherein a temperature sensing assembling port (5302) is formed in a middle of each supporting plate assembling groove (530) in a sunken mode, a temperature sensing unit electrically connected with the control device is arranged in each temperature sensing assembling port (5302), and the temperature sensing units are connected with the leveling bottom plate (52); and an assembling notch (5303) is formed in the upper portion of the supporting plate assembling groove (530) formed in the second side plate (14), and the assembling notch (5303) communicates with the opening clamping groove (5101).

2. The laminating machine according to claim 1, wherein a self-starting sensor (1101) in triggering fit with the laminating object is arranged at the inlet (10); a standby sensor (1102) in triggering fit with the laminating object is arranged at the outlet (15); the self-starting sensor (1101) and the standby sensor (1102) are electrically connected with the control device; the glue outlet roller set comprises a driving glue outlet roller (54) and a driven glue outlet roller (55) which are arranged in parallel, and driving glue outlet roller (54) is in transmission connection with the feeding driving device; and the a roller surface of the driving glue outlet roller (54) is in elastic abutting fit with a roller surface of the driven glue outlet roller (55), and each of two ends of the driven glue outlet roller (55) is provided with an elastic device.

3. The laminating machine according to claim 1, wherein the laminating machine further comprises a progress display device and a laminating progress detection assembly which are electrically connected to the control device, and the control device receives a laminating progress detection signal of the laminating progress detection assembly and outputs a laminating progress display signal to the laminating progress display device.

4. The laminating machine according to claim 3, wherein the laminating progress detection assembly comprises a first infrared sensing unit (81), a second infrared sensing unit (82) and a third infrared sensing unit (83) which are electrically connected with the control device, the first infrared sensing unit (81) is arranged at the inlet (10), the second infrared sensing unit (82) is arranged on one side of the laminating roller set, and the third infrared sensing unit (83) is arranged at the outlet (15).

5. The laminating machine according to claim 1, wherein a top surface of the machine body is provided with a hidden button structure (9) which is connected with the control device, and the hidden button structure (9) comprises a press key or a touch key.

6. The laminating machine according to claim 5, wherein the press key comprises a key base and a solid button elastically installed on the key base, the key base is further provided with a microswitch electrically connected with the control device, and the solid button is in trigger fit with the microswitch; and the machine body (1) is provided with a key assembling port, the solid button is movably embedded into the key assembling port, and a top face of the solid button is flush with the top face of the machine body (1).

\* \* \* \* \*